United States Patent [19]

Nölken

[11] 4,233,198
[45] Nov. 11, 1980

[54] AQUEOUS VINYL POLYMER DISPERSION EMULSIFIED WITH AN ALKANE PHOSPHONIC ACID DERIVATIVE

[75] Inventor: Ernst Nölken, Frankfurt am Main, Fed. Rep. of Germany

[73] Assignee: Hoechst Aktiengesellschaft, Frankfurt am Main, Fed. Rep. of Germany

[21] Appl. No.: 946,378

[22] Filed: Sep. 27, 1978

[30] Foreign Application Priority Data

Sep. 29, 1977 [DE] Fed. Rep. of Germany ....... 2743764

[51] Int. Cl.³ ............................................. C08F 2/26
[52] U.S. Cl. ...................... 260/29.6 MP; 260/29.7 P; 526/193; 526/911
[58] Field of Search .................. 260/29.6 MP, 29.7 P; 526/193, 911

[56] References Cited

U.S. PATENT DOCUMENTS 3,182,044  5/1965  Messwarb et al. .................. 526/193

FOREIGN PATENT DOCUMENTS 604349  8/1960  Canada ............................ 260/29.6 MP
371595  10/1963  Switzerland ..................... 260/29.6 MP

*Primary Examiner*—Edward J. Smith
*Attorney, Agent, or Firm*—Curtis, Morris & Safford

[57] ABSTRACT

Vinyl polymers are prepared by emulsion polymerization of olefinically unsaturated compounds in the presence of surface-active compounds. As emulsifiers there are particularly suitable water-soluble salts of alkane phosphonic acids or of alkane phosphonic acid-monoalkyl esters. Said salts may also be used in combination with other surface-active compounds. The plastics dispersion obtained is used above all as a binder for pigments and fillers in dispersion paints.

8 Claims, No Drawings

AQUEOUS VINYL POLYMER DISPERSION EMULSIFIED WITH AN ALKANE PHOSPHONIC ACID DERIVATIVE

The present invention relates to an aqueous plastics dispersion on the basis of vinyl polymers.

It has already been proposed to prepare vinyl polymers by emulsion polymerization in the presence of surface-active compounds; however, the latices obtained are as a rule unstable, if they do not contain any further stabilizers. By using a greater amount of anionically active emulsifiers, the stability of the latex to mechanical stress, such as pumping and stirring, may indeed be increased, but at the same time this leads to a reduction of the thermostability of the polymers or of the water resistance of the film obtained from the latex. The additional use of protective colloids or copolymers of unsaturated acids has analogous effects.

It is the object of the invention to prepare an aqueous plastics dispersion having a high shear strength as well as a good thermostability which may be used above all as a binder for dispersion paints and yields films with a good wet adhesion.

The present invention provides an aqueous plastics dispersion containing a vinyl polymer and an emulsifier, wherein the emulsifier is a water-soluble salt of an alkane phosphonic acid or of an alkane phosphonic acid-monoalkyl ester or is a mixture of such a salt with an alkane phosphonic acid or an alkane phosphonic acid-monoalkyl ester, the alkyl radical bound to the phosphorus atom having from 6 to 24 carbon atoms each, and the alkyl radical of the ester group having from 1 to 8 carbon atoms. The invention also relates to a process for the preparation of the above-mentioned plastics dispersion, while using one of the above-specified salts of the salt-acid mixture as emulsifier.

As emulsifier for the aqueous plastics dispersion of the invention there is used a water-soluble salt of an alkane phosphonic acid or of an alkane phosphonic acid-monoalkyl ester or a mixture of such a salt with an alkane phosphonic acid or an alkane phosphonic acid-monoalkyl ester, the alkyl radical bound to the phosphorus atom having from 6 to 24 carbon atoms each, and the alkyl radical of the ester group having from 1 to 8 carbon atoms.

Preference is given to salts of alkane phosphonic acids of the formula (I)

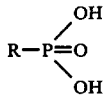

and salts of alkane phosphonic acid-monoalkyl esters of the formula (II)

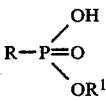

in which R represents in each case a—preferably linear—alkyl radical with from 6 to 24, preferably from 8 to 18 carbon atoms which may be substituted by a phenyl, hydroxyl, or carboxyl radical, and $R^1$ is a—preferably linear—alkyl radical with from 1 to 8, preferably 1 to 4 carbon atoms. There are suitable, for example, salts of n-hexane phosphonic acid, n-octane phosphonic acid, n-nonane phosphonic acid, n-decane phosphonic acid, n-dodecane phosphonic acid, n-tetradecane phosphonic acid and n-hexadecane phosphonic acid as well as salts of the corresponding monomethyl ester, monoethyl ester, monopropyl ester and mono-n-butyl ester.

The salts of alkane phosphonic acids or of alkane phosphonic acid-monoalkyl esters used as emulsifiers according to the invention must be soluble in water. Particularly suitable are alkali metal salts, such as sodium salts and potassium salts, as well as ammonium salts, i.e. salts of ammonia and salts of primary, secondary or tertiary aliphatic amines. As aliphatic amines there may be mentioned preferably mono-, di- and trialkyl amines, whose alkyl radicals are identical or different, having from 1 to 4 carbon atoms each and optionally being substituted by a hydroxyl radical. There may be mentioned, for example, methylamine, ethylamine, propylamine, dimethylamine, diethylamine, dipropylamine, trimethylamine, triethylamine, tripropylamine, ethanolamine, diethanolamine, triethanolamine, N,N-dimethylamino-ethanol and 2-amino-2-methyl-propanol-(1). There may also be used cyclic amines, for example, piperidine, morpholine and piperazine, as well as linear polyamines, for example ethylene diamine, diethylene triamine and triethylamine tetramine.

The alkane phosphonic acids are prepared by a rearrangement of trialkyl phosphites or a reaction of dialkyl phosphites with olefins in the presence of peroxides and a subsequent complete hydrolysis of the alkane phosphonic acid diesters obtained. The alkane phosphonic acid-monoalkyl esters are prepared by partial hydrolysis of the above-mentioned alkane phosphonic acid diesters (cf. German Patent Specification No. 24 41 783). The salts used according to the invention are prepared by a neutralization of the alkane phosphonic acids or alkane phosphonic acid-monoesters with bases. As bases there are used alkali metal hydroxides, alkali metal carbonates, ammonia and ammonium carbonate as well as the above-mentioned amines. When using the alkane phosphonic acids, the neutralization may be effected partially or completely, so that primary or secondary salts are formed.

The polymerization of the vinyl monomers is effected in the presence of at least one salt of an alkane phosphonic acid or of an alkane phosphonic acid-monoalkyl ester acting as emulsifier. In this process the salt may be added as such to the polymerization mixture, or it may be formed in situ by the neutralization of an alkane phosphonic acid or an alkane phosphonic acid-monoalkyl ester. The emulsifier may be introduced prior to starting the polymerization or is partially introduced, an additional amount being added in doses during polymerization.

The amount of alkane phosphonic acid salt or alkane phosphonic acid-monoalkyl ester salt used in the process of the invention is in the range of from 0.1 to 5, preferably from 0.3 to 3% by weight, calculated on the total amount of the vinyl monomers. The salts may be used separately or in combination with one another, in which process use is preferably made of mixtures of salts of those alkane phosphonic acids, whose alkyl radicals bound to the phosphorus atom are different. The salts may also be used in admixture with free alkane phosphonic acid or free alkane phosphonic acid-monoalkyl ester; the salt proportion in mixtures of this kind is in the range of from 10 to 90, preferably from 40 to 80% by weight. It is also possible to use the salts in combination with known surface-active compounds, for example alkyl sulfates, alkane sulfonates, sulfosuccinic acid esters and esters of phosphoric acid with alcohols, oxyethylated alcohols or alkyl phenols.

Within the scope of the invention there are suitable all vinyl monomers that are polymerizable in an aqueous dispersion, i.e. olefinically unsaturated compounds, above all compounds of the formula (III)

$$H_2C=CH-R^2 \qquad (III),$$

in which $R^2$ is a hydrogen atom, an alkyl radical with from 1 to 4 carbon atoms, an alkoxy radical with from 1 to 4 carbon atoms, an alkyl carboxy radical with from 2 to 12, preferably 2 to 10 carbon atoms, a nitrile group, a halogen atom, preferably a chlorine atom, a phenyl radical or an alkoxy carbonyl radical with from 2 to 12, preferably 2 to 9 carbon atoms. Instead of a single vinyl monomer there may also be used a mixture of several vinyl monomers.

Suitable vinyl monomers are especially olefins, for example ethylene and isobutylene, vinyl ethers, such as vinylmethyl ether, vinylethyl ether and vinyl-n-butyl ether, vinyl esters of aliphatic monocarboxylic acids, for example vinyl acetate, vinyl propionate, vinyl butyrate, vinyl laurate and vinyl decanates, vinylidene chloride, acrylonitrile, vinyl chloride, styrene, acrylic acid esters of monovalent alkanols, for example methyl acrylate, ethyl acrylate, butyl acrylate and 2-ethylhexyl acrylate, as well as methacrylic acid esters of monovalent alkanols, for example methyl methacrylate, ethyl methacrylate, butyl methacrylate and 2-ethylhexyl methacrylate. Use is preferably made of a vinyl ester, optionally together with one or two further vinyl monomers.

When using easily saponifiable vinyl monomers, for example vinyl esters, it is recommended to use a primary salt of an alkane phosphonic acid and to maintain the polymerization medium at a pH value of from 3 to 7, preferably from 4.5 to 6.

The polymerization of the respective vinyl monomers is effected under known conditions in the presence of a radical-forming initiator, preferably a peroxy compound or an aliphatic azo compound; appropriate initiators are, for example, the alkali metal salts or ammonium salts of peroxy-disulfuric acid or peroxy-diphosphoric acid as well as azo-$\gamma,\gamma'$-bis(4-cyanovaleric acid). The initiator is used in an amount of from 0.05 to 1, preferably from 0.1 to 0.4% by weight, calculated on the total amount of the vinyl monomers. The initiator may optionally be used together with a reducing agent, for example with an alkali metal sulfite, an allkali metal thiosulfate, an alkali metal dithionite, a formaldehyde sodium sulfoxylate or a salt of a heavy metal. The initiator may be introduced prior to starting the polymerization or may be added to the polymerization mixture in doses; the same is true for the reducing agent. The polymerization is carried out at a temperature of from 25° to 90° C., preferably from 40° to 75° C.

The plastics dispersion of the invention may also contain additives which have a favorable influence on the viscosity, the wetting power and the dispersibility, as well as on the stability to freezing and electrolytes and on the foaming properties. The amount of additives is generally altogether 10% by weight at a maximum, preferably from 1 to 5% by weight, calculated on the plastics dispersion.

As thickening agents there may be used cellulose derivatives, for example methyl, hydroxyethyl, hydroxypropyl and carboxymethyl cellulose, poly(vinyl alcohol), poly(vinylpyrrolidone), poly(ethylene-glycol), salts of poly(acrylic acid) and salts of acrylic acid/acrylamide copolymers.

As wetting and dispersing agents there are suitable sodium polyphosphate, salts of low-molecular-weight poly(acrylic acid), salts of poly(ethene-sulfonic acid), salts of poly(vinyl-phosphonic acid), salts of poly(maleic acid) and salts of copolymers of maleic acid with ethylene, 1-olefins with 3 to 18 carbon atoms, vinyl alkyl ethers with 3 to 14 carbon atoms and/or styrene.

In order to increase the stability to freezing and electrolytes there may be added to the dispersion monomer 1,2-diols, for example glycol, propylene-glycol-(1,2), and butylene-glycol-(1,2) or polymers thereof, or oxethylated compounds, for example reaction products of ethylene oxide with long-chain alkanols, amines, carboxylic acids, carboxylic acid amides, alkyl phenols, poly(propylene-glycol) or poly(butyleneglycol).

The minimum temperature of film formation (white point) of the plastics dispersion may be reduced by adding solvents, such as ethylene-glycol, butyl-glycol, ethyl-glycol acetate, ethyl-diglycol acetate, butyl-glycol acetate, butyl-diglycol acetate, benzine or alkylated aromatic hydrocarbons. As defoaming agents there are suitable for example poly(propylene-glycol) and polysiloxanes.

The plastics dispersion of the invention may be used as a coating substance and as an agent for the impregnation, coating and bonding of natural or synthetic materials, for example wood, paper, metals, textiles and plastics. It is particularly suitable as binder dispersion for pigments and fillers in dispersion paints.

The invention is further illustrated by the following Examples. Unless otherwise stated, the "parts" and "%" are "parts by weight" and "percent by weight", respectively.

EXAMPLE 1

500 Parts of electrolyte-free water are introduced into a stirring vessel provided with an inner thermometer, a reflux condenser, a gas inlet tube, three dropping funnels and a glass electrode to measure the pH value, then they are washed with nitrogen. 11% of a solution of 27 parts of n-octane phosphonic acid in 100 parts of water, which has been adjusted with 20% sodium hydroxide solution to a pH value of 6, and a solution of 0.9 part of ammonium persulfate in 20 parts of water are added in doses. The internal temperature is increased to 60° C., and a mixture of 592 parts of vinyl acetate and 148 parts of vinyl esters of a mixture of tertiary aliphatic carboxylic acids with 10 carbon atoms is added in doses in the course of 3 hours. During the addition of the monomers the remaining 89% of the octane phosphonic acid solution are added in doses as well as 50 parts of a 1.25% sodium carbonate solution, to maintain a pH value of 5 during the polymerization. Subsequently a solution of 0.45 part of ammonium persulfate in 30 parts of water is added, the internal temperature is increased to 75° C., the mixture is continued to be stirred for 1 hour at this temperature and is then cooled to room temperature.

A fine-particle vinyl acetate copolymer dispersion is obtained which has a solids content of 51.5%. The average diameter of the polymer particles is 0.32 μm. The $\iota_{red}$ value of the copolymer (measured in dimethylformamide at 20° C.) is 9.76 dl/g. In order to test the shear strength of the latex, the latter is stirred for 2 minutes at a stirring speed of 5,000 rpm. Under this shearing stress no coagulate is formed, and the average diameter of the polymer particles is unaltered.

EXAMPLE 2

(A) 500 Parts of electrolyte-free water are introduced into the polymerization apparatus of Example 1 and are washed with nitrogen. Then there are added in doses 11% of a solution of 9 parts of n-decane phosphonic acid in 100 parts of water, the solution having been adjusted to a pH value of 6 with 20% sodium hydroxide solution, as well as a solution of 1.35 parts of ammonium persulfate in 20 parts of water. The internal temperature is increased to 60° C., and a mixture of 592 parts of vinyl acetate and 148 parts of vinyl esters of a mixture of tertiary aliphatic carboxylic acids with 10 carbon atoms is added in doses in the course of 3 hours. During the addition of the monomers the remaining 89% of the decane phosphonic acid solution are added in doses as well as 18 parts of a 1.25% sodium carbonate solution, to maintain a pH value of 5 during the polymerization. Thereafter the internal temperature is increased to 75° C., and stirring is continued for about 1 hour at this temperature. For the period of after-heating the pH value of the polymerization medium is attained at 5 by the metered addition of 42 parts of a 1.25% sodium carbonate solution. Upon cooling to room temperature, another 50 parts of the same sodium carbonate solution are added in order to adjust the pH value of the dispersion to 6. A fine-particle vinyl acetate copolymer dispersion is obtained which has a solids content of 50.8%. The average diameter of the polymer particles is 0.20 μm. The $\eta_{red}$ value of the copolymer (measured as in Example 1) is 10.2 dl/g.

(B) First, a pigment paste having the following composition is prepared, which is then stirred for 10 minutes at a stirring speed of 3,000 rpm in order to disperse the pigment:
water: 41 parts
3% hydroxyethyl cellulose solution: 15.6 parts
sodium tripolyphosphate: 0.4 part
25% ammonia solution: 1.0 part
30% ammonium polyacrylate: 3.0 parts
polysiloxane defoaming agent: 3.0 parts
titanium dioxide (rutile): 175 parts
propylene-glycol-(1,2): 10 parts
900 Parts of the plastics dispersion obtained according to 2(A) are adjusted to a pH value of 9.5 with a concentrated ammonia solution, stirred with 22.5 parts of a 20% ammonium laurate solution and 135 parts of a 10% hydroxyethylcellulose solution and thereafter stirred into the above pigment paste. Subsequently the mixture is also stirred together with a mixture of 10 parts of butyl-diglycol acetate and 27 parts of propylene-glycol-(1,2).

With the paint obtained, coats of paint are applied onto an alkyd resin paint, and after drying for 24 hours at 23° C., said coats are tested for their adhesion by means of a wet hog's bristle brush. After 3,000 double strokes with said brush the coats of paint are still intact.

(C) If by a corresponding process a latex is prepared with sodium lauryl sulfate as known emulsifier and the paint obtained thereof is tested for its wet adhesion, as has been described above, the coats of paint are destroyed after 200 to 300 double strokes with the brush.

EXAMPLE 3

The process is carried out as has been described in Example 2, however, while using instead of 9 parts of decane phosphonic acid the same amount of n-dodecane phosphonic acid. As compared with Example 2, however, there are used 140 parts of a 1.25% sodium carbonate solution, to maintain the pH value of 5 during the polymerization and after-heating periods. The solids content of the dispersion is 49.8%, the average diameter of the polymer particles is 0.216 μm.

EXAMPLE 4

(A) The process is carried out as in Example 2, however, while using n-tetradecane phosphonic acid instead of the decane phosphonic acid. The solution is heated during the metered addition. A copolymer dispersion of low viscosity is obtained which has a solids content of 52%.

(B) As has been described in Example 2, a paint and coats of paint are prepared from the dispersion, and said coats are tested for their wet adhesion. They are still intact after 3,000 double strokes by brush.

EXAMPLE 5

(A) The process is carried out as in Example 1, however, while using instead of 27 parts of n-octane phosphonic acid a mixture of 7.2 parts of n-octane phosphonic acid and 1.8 parts of sodium lauryl sulfate. The average diameter of the polymer particles is 0.254 μm.

(B) As has been described in Example 2, a paint and coats of paint are prepared from the dispersion, and said coats are tested for their wet adhesion. They are still intact after 3,000 double strokes by brush.

EXAMPLE 6

(A) 460 Parts of electrolyte-free water are introduced into a stirring apparatus provided with an inner thermometer, a reflux condenser and two dropping funnels, then they are washed with nitrogen. After having adjusted the internal temperature to 45° C., a solution of 0.9 part of ammonium persulfate in 20 parts of water is added as well as 50% of a solution of 15 parts of n-decane phosphonic acid in 200 parts of water which has been adjusted to a pH value of 6.8 with 20 parts by volume of a 20% caustic potash solution. The internal temperature is increased to 60° C., and within 3 hours 750 parts of vinyl acetate as well as the remaining 50% of the decane phosphonic acid solution are added in doses. Thereafter a solution of 0.45 parts of ammonium persulfate in 30 parts of water is added, stirring is continued for 1 hour at 75° C., and then the mixture is cooled to room temperature.

A coagulate-free poly(vinyl acetate) dispersion of low viscosity and with very fine particles is obtained. Its pH value is 5.7, the solids content is 50.25%, the $\eta_{red}$ value is 5.6 dl/g (determined as in Example 1).

(B) A film prepared from the dispersion is colorless after having been heated for 16 hours at 110° C. The same result is obtained with films that were prepared in an analogous manner from copolymer dispersions of vinyl acetate with 2-ethylhexyl acrylate (monomer ratio 90:10, 80:20 or 70:30) or of vinyl acetate with vinyl esters of a mixture of tertiary aliphatic carboxylic acids with 10 carbon atoms (monomer ratio 90:10, 80:20 or 70:30).

(C) If a poly(vinyl acetate) film which only contains dodecyl benzene sulfonate as emulsifier due to the disersion preparation is treated accordingly, the poly(vinyl acetate) shows a light brown discoloration; if the poly(vinyl acetate) contains only sodium lauryl sulfate as emulsifier, the film shows a dark brown discoloration after 16 hours of storage at 110° C.

EXAMPLE 7

10,000 Parts of electrolyte-free water are introduced with vacuum into a stirring autoclave, and the water is washed with nitrogen, while stirring. 20 Bars of ethylene are pressed into the autoclave, and the internal temperature is adjusted to 45° C. 25% of a solution (I) of 75 parts of n-decane phosphonic acid in 2,000 parts of water, which solution has been adjusted to a pH value of 6.8 by means of 50% sodium hydroxide solution and contains 19 parts of sodium sulfite, and 1,270 parts of vinyl acetate are added in doses. Thereafter a solution of 45 parts of ammonium persulfate in 400 parts of water is added in doses, and the internal temperature is increased to 60° C. In the course of 6 hours the remaining 75% of the solution (I) as well as further 11,430 parts of vinyl acetate are added in doses. In this process the ethylene pressure is maintained at 20 bars by a subsequent introduction by pressure of ethylene, and the internal temperature is maintained at 60° C. by external cooling of the autoclave. Thereafter the ethylene supply is completed, 15 parts of ammonium persulfate in 100 parts of water are added in doses, and the contents of the autoclave are heated to 85° C. During the heating and during the first 30 minutes at 85° C. a solution of 130 parts of n-decane phosphonic acid in 1,170 parts of water, which has been adjusted to a pH value of 6.8 with 50% sodium hydroxide solution, is added in doses, thereafter stirring is continued for 30 minutes at 85° C., and the contents of the autoclave are cooled to room temperature. A fine-particle vinyl acetate/ethylene copolymer dispersion of low viscosity is obtained which is resistant to shearing and has a solids content of 51.5%. The $\eta_{red}$ value of the copolymer is 2.98 dl/g (measured as in Example 1).

EXAMPLE 8

A solution of 150 parts of n-decane phosphonic acid in 11,170 parts of electrolyte-free water, which solution has been adjusted to a pH value of 6.8 with 190 parts by volume of a 20% caustic potash solution, is introduced with vacuum into a stirring autoclave and is then washed with nitrogen, while stirring. Subsequently 20 bars of ethylene are introduced by pressure, the internal temperature is increased to 45° C., and 10% of a mixture of 8,890 parts of vinyl acetate and 3,810 parts of vinnyl chloride are introduced by pumping. A solution of 45 parts of ammonium persulfate in 400 parts of water is added in doses, and the internal temperature is increased to 60° C. and the ethylene pressure to 45 bars. The remaining 90% of the vinyl acetate/vinyl chloride mixture as well as a solution of 150 parts of decane phosphonic acid in 2,000 parts of water, the solution having been adjusted to a pH value of 6.8 with 190 parts by volume of a 20% caustic potash solution and containing 19 parts of sodium sulfite, are added in doses within 6 hours. The internal temperature is maintained at 60° C. by external cooling, and the ethylene pressure is maintained at 45 bars. After 6 hours the ethylene supply is finished, and a solution of 15 parts of ammonium persulfate in 600 parts of water is added in doses. The internal temperature is increased to 85° C., and the mixture is continued to be stirred at this temperature for 1 hour. After cooling to room temperature the pressure in the autoclave is released.

A fine-particle vinyl acetate/vinyl chloride/ethylene terpolymer dispersion which is resistant to shearing is obtained, which has a solids content of 49%. The average diameter of the polymer particles is 0.108 μm and the ethylene content of the terpolymer is 16%. A film prepared from the dispersion is colorless after 16 hours of storage at 110° C.

EXAMPLE 9

550 Parts of electrolyte-free water and 0.9 part of ammonium persulfate are introduced into a stirring flask provided with an inner thermometer, a reflux condenser, a gas inlet tube and 3 dropping funnels. The mixture is washed with nitrogen for 15 minutes and is heated to 60° C. In the course of 3 hours a monomer mixture of 592 parts of vinyl acetate and 148 parts of the vinyl esters of a mixture of tertiary saturated aliphatic carboxylic acids with 10 carbon atoms as well as a solution of 9 parts of the sodium salt of n-hexadecane phosphonic acid monomethyl ester (prepared by the saponification of n-hexadecane phosphonic acid dimethyl ester with sodium hydroxide solution) in 100 parts of water (pH value of 10.1) are added in doses. The internal temperature is maintained at 60° C. by cooling, and the pH value is maintained at 5 during the polymerization by the metered addition of 14 ml of a 1.25% sodium carbonate solution. After the addition of the monomers, a solution of 0.45 part of ammonium persulfate in 10 parts of water is added subsequently, and stirring is continued for 30 minutes at 75° C. After cooling the dispersion to room temperature, the pH value is adjusted to 6 with 36 parts of a 1.25% sodium carbonate solution.

A coagulate-free dispersion of low viscosity is obtained which has a solids content of 50.8%. The average diameter of the polymer particles is 0.268 μm. The film prepared at room temperature does not show any white discoloration after 20 minutes. The dispersion proves to be stable in the shear test carried out as in Example 1. After 16 hours at 110° C. the film is colorless to very slightly yellow. With the dispersion, a gloss paint is prepared according to the method described in Example 2, and the film obtained thereof is tested for its wet adhesion. The coats of paint are still intact after 3,000 double strokes by brush.

EXAMPLE 10

As has been described in Example 6, a poly(vinyl acetate) dispersion is prepared, however, wherein the emulsifier solution used consists of 15 parts of n-decane phosphonic acid monomethyl ester in 200 parts of water and has been adjusted to a pH value of 6 with 14 parts of a 20% caustic potash solution. The monomethyl ester was prepared by an acid partial saponification of the decane phosphonic acid dimethyl ester. A low-viscosity poly(vinyl acetate) dispersion is obtained which has a solids content of 51.3%. Its pH value is adjusted from 4.6 to 6 with ammonia solution. The average diameter of the polymer particles is 0.21 μm, the residual monomer content is 0.24%, the K value of the polymer is 104.4 (determined in dimethylformamide at 20° C.).

EXAMPLE 11

27.3 Parts of n-decane phosphonic acid monomethyl ester dissolved in 575 parts of water are neutralized with 50% sodium hydroxide solution (pH value=9) and are heated to 80° C. in the apparatus described in Example 6. 50 Percent of a solution of 3.4 parts of $K_2S_2O_8$ in 65 parts of water are added, and a mixture of 375 parts of methyl methacrylate and 375 parts of butyl acrylate are added in doses in the course of 3.5 hours. After one half of the monomers has been added, 35% of the $K_2S_2O_8$ solution are added in doses, and the remaining 15% are added upon introducing the rest of the monomers. Then the mixture is continued to be stirred for 45 minutes at 90° C. and is subsequently cooled to room temperature. A viscous and coagulate-free dispersion is obtained which has a solids content of 55.4%. The average diameter of the polymer particles is 0.1 μm. The dispersion proves to be stable in the shearing test at 5,000 rpm.

I claim:

1. An aqueous plastics dispersion containing a vinyl polymer and an emulsifier wherein the emulsifier is a water-soluble salt of an alkane-phosphonic acid of the formula

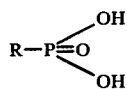

or of an alkane phosphonic acid monoalkyl ester of the formula

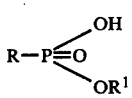

or a mixture of such salts and wherein: R is an alkyl radical of 6 to 24 carbon atoms which may be substituted by a phenyl, hydroxyl or carboxyl radical, and $R^1$ is an alkyl radical of 1 to 8 carbon atoms.

2. The plastics dispersion of claim 1, wherein the salt is an ammonium salt or an alkali metal salt.

3. The plastics dispersion of claim 1, wherein the alkane phosphonic acid is a compound of the formula (I)

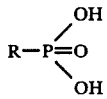 (I)

in which R is a linear or branched alkyl radical having from 6 to 24 carbon atoms which radical may be substituted by a phenyl, hydroxyl, or carboxyl radical.

4. The plastics dispersion of claim 1 wherein the alkane phosphonic acid-monoalkyl ester is a compound of the formula (II)

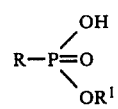 (II)

in which R is a linear or branched alkyl radical having from 6 to 24 carbon atoms which radical may be substituted by a phenyl, hydroxyl or carboxyl radical and $R^1$ is an alkyl radical having from 1 to 8 carbon atoms.

5. The plastics dispersion of claim 1, wherein the salt is an ammonium, sodium or potassium salt of an alkane phosphonic acid or of an alkane phosphonic acid-monoalkyl ester, the alkyl radical bound to the phosphorus atom being linear.

6. A process for preparing an aqueous plastics dispersion of a vinylic polymer which comprises polymerizing at least one vinyl monomer in an aqueous dispersion in the presence of an emulsifier as defined in claim 1.

7. An aqueous plastics dispersion containing a vinyl polymer and an emulsifier wherein the emulsifier is a water-soluble salt of an alkane-phosphonic acid of the formula

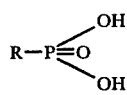

or of an alkane phosphonic acid monoalkyl ester of the formula

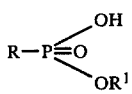

or a mixture of such salts and wherein: R is an alkyl radical of 6 to 24 carbon atoms which may be substituted by phenyl or hydroxyl and $R^1$ is an alkyl radical of 1 to 8 carbon atoms.

8. An aqueous plastics dispersion containing a vinyl polymer and an emulsifier wherein the emulsifier is a water-soluble salt of an alkane-phosphonic acid of the formula

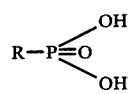

or of an alkane phosphonic acid monoalkyl ester of the formula

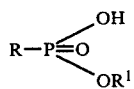

or a mixture of such salts and wherein: R is an unsubstituted alkyl radical of 6 to 24 carbon atoms, and $R^1$ is an alkyl radical of 1 to 8 carbon atoms.

* * * * *